(12) United States Patent
Kim

(10) Patent No.: US 10,386,458 B2
(45) Date of Patent: Aug. 20, 2019

(54) RADAR SIGNAL PROCESSING DEVICE AND METHOD

(71) Applicant: MANDO CORPORATION, Gyeonggi-do (KR)

(72) Inventor: In Soo Kim, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 302 days.

(21) Appl. No.: 15/623,342

(22) Filed: Jun. 14, 2017

(65) Prior Publication Data

US 2017/0363712 A1 Dec. 21, 2017

(30) Foreign Application Priority Data

Jun. 20, 2016 (KR) .................. 10-2016-0076255

(51) Int. Cl.
*G01S 7/02* (2006.01)
*G01S 13/34* (2006.01)
*G01S 13/93* (2006.01)

(52) U.S. Cl.
CPC ............ *G01S 7/023* (2013.01); *G01S 13/345* (2013.01); *G01S 13/931* (2013.01)

(58) Field of Classification Search
CPC ........ G01S 7/023; G01S 13/931; G01S 13/34; G01S 13/345
See application file for complete search history.

(56) References Cited

U.S. PATENT DOCUMENTS

| | | | |
|---|---|---|---|
| 2013/0106646 A1* | 5/2013 | Kitagawa | G01S 7/354 342/87 |
| 2015/0084807 A1* | 3/2015 | Nozawa | G01S 7/354 342/112 |
| 2017/0023662 A1* | 1/2017 | Ding | G01S 7/023 |

* cited by examiner

*Primary Examiner* — Matthew M Barker
(74) *Attorney, Agent, or Firm* — Ladas & Parry, LLP

(57) ABSTRACT

The present invention relates to a device that processes a radar signal, and a method therefor. More particularly, the present invention relates to a device and a method for reducing an interference signal by predicting occurrence of an in-band interference signal. Particularly, the present invention provides a radar signal processing device and method, the radar signal processing device comprising: an interference reference flag configuration unit that divides a transmission signal into a plurality of blocks in preconfigured time units on a time axis, and configures an interference reference flag for one or more specific blocks selected among the plurality of blocks; an impulsive noise detection unit that detects whether an impulsive noise occurs in each of the plurality of blocks, by using a reception signal; an in-band flag configuration unit that configures an in-band flag by using the interference reference flag and a block in which the impulsive noise is detected; and an interference signal prediction unit that predicts introduction of an in-band interference signal according to whether an in-band flag exists.

18 Claims, 14 Drawing Sheets

1000 Host

1009 Interferer

| Based on Host | Apply present invention to both Interferer and Host | | Apply present invention only to Host | |
|---|---|---|---|---|
| | Host | Interferer | Host | Interferer |
| Configure In-band flag for block of Down Chirp | x + α1 ms Delay | y + α2 ms Delay | x + α1 ms Delay | - |
| Configure In-band flag for block of Up Chirp | y + α2 ms Delay | x + α1 ms Delay | y + α2 ms Delay | - |

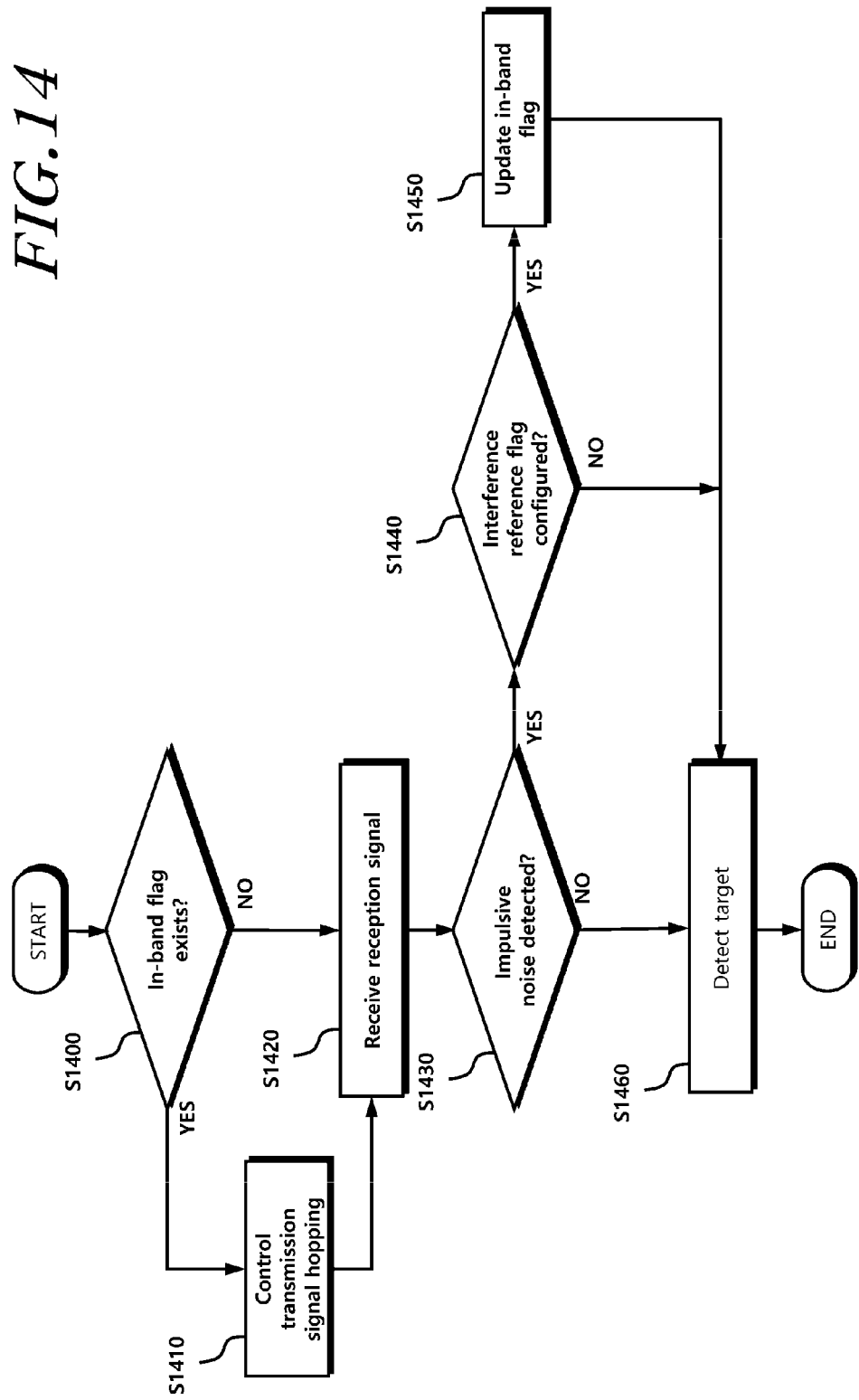

RADAR SIGNAL PROCESSING DEVICE AND METHOD

CROSS REFERENCE TO RELATED APPLICATION

This application claims priority from Korean Patent Application No. 10-2016-0076255, filed on Jun. 20, 2016, which is hereby incorporated by reference for all purposes as if fully set forth herein.

BACKGROUND OF THE INVENTION

1. Field of the Invention

The present invention relates to a radar signal processing device and method and, more particularly, to a device and a method for reducing an interference signal by predicting occurrence of an in-band interference signal.

2. Description of the Prior Art

A radar device is a device which detects a target by using a transmission signal and a reception signal, that is the transmission signal reflected from the target and then received, and extracts information on the target, and is used in various fields. For example, a radar sensor is mounted in a vehicle to detect an object on the road, and is used to acquire information on the detected object.

This radar device technology may be divided into an RF technology and a signal processing technology, and the signal processing technology is divided into various fields, such as a high resolution distance and velocity extraction technology, a multiple target detection technology, a multi-radar interference elimination technology, a clutter removal technology, etc., to be studied.

Particularly, in a situation where a large number of interference signals are received together with a target signal reflected by a target, an interference elimination technology that accurately acquires only a target signal to extract target information is directly associated with performance of a radar device.

However, in a case of an in-band interference signal using the same band as that of a transmission signal, only a technology for randomly avoiding the in-band interference signal is being studied. Accordingly, as the in-band interference signal is randomly avoided instead of being detected, there occurs a problem in which the possibility of occurrence of the in-band interference signal is high.

SUMMARY OF THE INVENTION

The present invention described above is to propose a radar signal processing device and method, which provides a proper avoiding method by predicting occurrence of an in-band interference signal.

In addition, the present invention is to propose a more efficient interference elimination technology by predicting occurrence of an in-band interference signal and providing a method for avoiding the in-band interference signal in advance through a signal processing technology without adding hardware.

The present invention devised to solve the previously described problem provides a radar signal processing device including: an interference reference flag configuration unit that divides a transmission signal into a plurality of blocks in preconfigured time units on a time axis, and configures an interference reference flag for one or more specific blocks selected among the plurality of blocks; an impulsive noise detection unit that detects whether an impulsive noise occurs in each of the plurality of blocks, by using a reception signal; an in-band flag configuration unit that configures an in-band flag by using the interference reference flag and a block in which an impulsive noise is detected; and an interference signal prediction unit that predicts introduction of an in-band interference signal according to whether an in-band flag exists.

Further, the present invention provides a radar signal processing method including: an interference reference flag configuration step of dividing a transmission signal into a plurality of blocks in preconfigured time units on a time axis, and configuring an interference reference flag for one or more specific blocks selected among the plurality of blocks; an impulsive noise detection unit of detecting whether an impulsive noise occurs in each of the plurality of blocks, by using a reception signal; an in-band flag configuration step of configuring an in-band flag by using the interference reference flag and a block in which an impulsive noise is detected; and an interference signal prediction step of predicting introduction of an in-band interference signal according to whether an in-band flag exists.

The present invention provides an effect capable of preventing an occurrence of interference due to an in-band interference signal by detecting introduction of the in-band interference signal in advance.

Further, the present invention provides an effect of increasing a probability of avoidance in comparison with a random avoidance method and preventing unnecessary use of a resource, by detecting introduction of the in-band interference signal and avoiding the in-band interference signal.

BRIEF DESCRIPTION OF THE DRAWINGS

The above and other objects, features and advantages of the present invention will be more apparent from the following detailed description taken in conjunction with the accompanying drawings, in which:

FIG. 14 is a drawing for explaining an operation of updating an in-band flag in a radar signal processing procedure according to an embodiment of the present invention.

DETAILED DESCRIPTION OF THE EXEMPLARY EMBODIMENTS

Figure 1:
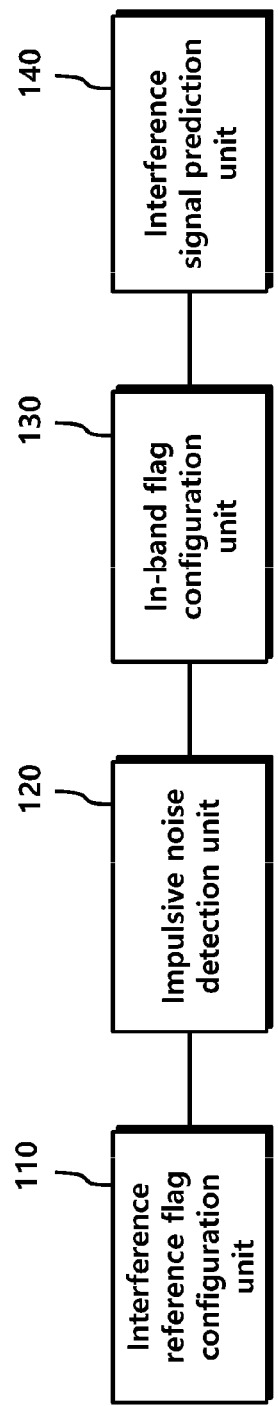
FIG. 1 is a drawing for explaining a configuration of a radar signal processing device according to an embodiment of the present invention.

The present invention provides a radar signal processing device and method.

Hereinafter, embodiments of the present invention will be described in detail with reference to the accompanying drawings. In the description of the elements of the present invention, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

A radar of the present specification refers to a device that propagates a transmission signal in the air, detects a target by receiving a reception signal reflected from the target and then returned, and extracts information of the target. Therefore, the radar of the present specification may include an antenna for transmission or reception. In addition, the radar of the present specification is assumed to be a radar using a Frequency Modulated Continuous Wave (FMCW), but it is not limited thereto. That is, the radar may be applied to a pulse radar, a Frequency Shift Keying (FSK) radar, and the like. In other words, a technology of dividing blocks of transmission signals of various radars and detecting an interference signal in advance using an interference reference flag configured for a corresponding block may belong to the scope of the present invention, and a position for which an interference reference flag is configured may be variously modified according to characteristics of the radars.

Meanwhile, an in-band interference signal described hereinbelow refers to a noise using a band that is the same as or similar to a frequency band used by a corresponding radar among noises which may be included in a reception signal of the radar. For example, the in-band interference signal may be a transmission signal transmitted by another radar device using the same or similar frequency band. Such an in-band interference signal is very difficult to be eliminated in that the in-band interference signal is received using the same or similar frequency band unlike other noises having different frequency bands. Therefore, when an in-band interference signal is introduced, there may occur a problem in which performance of the radar may be seriously degraded. Conventionally, only a random avoidance method for avoiding such an in-band interference signal has been disclosed. However, this method has a problem in that the possibility of avoidance is low and unnecessary resources are wasted for random avoidance.

Therefore, the present invention proposes a device that can eliminate an in-band interference signal more efficiently with a higher probability by detecting and avoiding a situation in which the in-band interference signal may occur, and a method therefor.

FIG. 1 is a drawing for explaining a configuration of a radar signal processing device according to an embodiment of the present invention.

Referring to FIG. 1, a radar signal processing device 100 includes: an interference reference flag configuration unit 110 that divides a transmission signal into a plurality of blocks in preconfigured time units on a time axis, and configures an interference reference flag for one or more specific blocks selected among the plurality of blocks; an impulsive noise detection unit 120 that detects whether an impulsive noise occurs in each of the plurality of blocks, by using a reception signal; an in-band flag configuration unit 130 that configures an in-band flag by using the interference reference flag and a block in which an impulsive noise is detected; and an interference signal prediction unit 140 that predicts introduction of an in-band interference signal according to whether an in-band flag exists.

The interference reference flag configuration unit 110 divides a transmission signal in preconfigured time units, and divides a transmission signal of a corresponding time unit into a plurality of blocks on a time axis. Further, the interference reference flag configuration unit 110 may determine whether to configure an interference reference flag for each of the plurality of divided blocks, and configure the interference reference flag for one or more selected specific blocks. For example, the preconfigured time unit may be an integer multiple of a transmission signal period. The length of a time axis of each block may be configured in advance, and may be dynamically configured according to a detection sensitivity of an in-band interference signal.

Meanwhile, the interference reference flag configuration unit 110 may determine whether to configure the interference reference flag in each of the divided blocks. The interference reference flag is used as one factor that determines an in-band flag configuration according to whether an impulsive noise is detected. For example, the interference reference flag may be configured to be one value of 0 and 1. For another example, the interference reference flag may be configured to allocate a value to only a specific block. A specific value of the interference reference flag has no limit, and may be configured in various schemes such that the block may be classified as a block for which the interference reference flag is configured, or a block for which the interference reference flag is not configured, such as on or off.

Further, the interference reference flag configuration unit 110 may be configured for one or more intervals of an up-chirp and a down-chirp when description is made with reference to one period (e.g., one triangular wave) of an FMCW transmission signal. Here, the up-chirp refers to an interval in which a frequency increases along with time based on a maximum frequency of the transmission signal, and the down-chirp refers to an interval in which the frequency decreases along with time based on the maximum frequency of the transmission signal. Terms used to describe the up-chirp and the down-chirp are for the sake of comprehension, and may be interchangeably used with various terms for dividing intervals, in which frequencies change along with time, in the FMCW transmission signal. Further, the interference reference flag configuration unit 110 may select specific blocks, for which the interference reference flag is configured, to be continuous when selecting the specific blocks. For example, when two specific blocks are selected in the up-chirp interval, the two specific blocks are continuous in time. Likewise, when three specific blocks are selected in the down-chirp interval, the three specific blocks are continuous in time.

Meanwhile, the interference reference flag configuration unit 110 may use various factors in selecting a specific block for which the interference reference flag is configured. For example, the interference reference flag configuration unit 110 may configure a specific block, for which the interference reference flag will be configured, by using, as a factor, at least one piece of information among information of a time axis position with respect to a maximum frequency of the transmission signal, information of a maximum reception signal delay time for detecting a reception signal, that is the transmission signal reflected from a target and then received, preconfigured interference signal detection sensitivity information, and chirp interval information of the transmission signal. Whether to use each factor or a specific method of selecting a specific block, for which the interference reference flag is configured, by using each factor may vary according to a system configuration of a user and the like. In other words, the present invention is mainly characterized by a technology that predicts introduction of the in-band interference signal according to the relationship between a specific block and a block in which an impulsive noise occurs, by configuring the interference reference flag for the specific block in advance, and the configuration of the specific block may be variously modified and applied.

For example, the specific block for which the interference reference flag is configured may be differently selected in the previously described up-chirp interval and down-chirp interval. For example, in the down-chirp interval of the transmission signal, the interference reference flag configuration unit 110 may configure the interference reference flag by selecting, as one or more specific blocks, a reference block determined by using a time axis position with respect to a maximum frequency of the transmission signal and N continuous blocks after the reference block. For another example, in the up-chirp interval of the transmission signal, the interference reference flag configuration unit 110 may configure the interference reference flag by selecting, as one or more specific blocks, a reference block determined by using a time axis position with respect to the maximum frequency of the transmission signal and M continuous blocks before the reference block. Here, N and M are natural numbers, and their values may be determined according to interference signal sensitivity information relating to a degree of sensitivity in detecting an interference signal. For example, when it is intended to detect introduction of the interference signal more quickly, an interference signal sensitivity value increases, and an N or M value increases.

That is, the number of specific blocks for which the interference reference flag is configured increases. On the contrary, when it is intended to configure the interference signal sensitivity value to be lowered in order to increase accuracy, the number of specific blocks may be lowered by configuring the N or M value to be low. The interference signal sensitivity information may be modified according to a system configuration or a user configuration.

Meanwhile, for another example, the specific block for which the interference reference flag is configured may be determined in advance. For example, the specific block for which the interference reference flag is configured may be associated with a period of the transmission signal and determined in advance. This may be configured in advance by a system, and may be dynamically configured in advance according to a change in the interference signal sensitivity information.

Meanwhile, the impulsive noise detection unit 120 may check whether an impulsive noise occurs, by analyzing a reception signal. For example, the impulsive noise corresponds to a peak component occurring in a time domain of the reception signal, and increases a noise level (noise floor level) in a frequency domain. The impulsive noise may occur according to various occurrence conditions. For example, in a case where an interference signal is introduced, the impulsive noise may occur when the transmission signal and the interference signal have an identical frequency value at a specific time point. That is, the impulsive noise may occur at a part where a waveform of the transmission signal and a waveform of the interference signal are crossed. Therefore, the impulsive noise detection unit 120 may monitor through signal processing whether the impulsive noise occurs, and may check to which block among the previously described transmission signal blocks the time point at which the impulsive noise occurs belongs.

Further, the in-band flag configuration unit 130 may configure an in-band flag by using an interference reference flag and a block in which an impulsive noise is detected. When the impulsive noise is detected, the in-band flag configuration unit 130 may determine whether to configure an in-band flag for a corresponding block, by using interference reference flag information of the block in which the corresponding impulsive noise is detected. For example, when the impulsive noise occurs in a specific block for which the interference reference flag is configured, the in-band flag configuration unit 130 may configure the in-band flag for the block in which the impulsive noise is detected. Accordingly, it may be detected in advance that there is a possibility in which the in-band interference signal is introduced after the corresponding block.

Particularly, it is possible that the impulsive noise may occur at the part where the waveform of the transmission signal and the waveform of the reception signal are crossed, and a position at which the in-band interference signal will occur exists at the part where the waveforms are crossed. That is, when the in-band interference signal occurs, the impulsive noise may always be involved. However, an out-band interference signal is generated when a time axis interval between the transmission signal and the reception signal is formed to have a value equal to or greater than a specific value, and an in-band interference signal is generated when the time axis interval is formed to have a value smaller than a specific value. Therefore, when the in-band interference signal is introduced from the up-chirp or down-chirp interval of the transmission signal, an impulsive noise is involved. That is, when the impulsive noise occurs, a noise according to the in-band interference signal may occur in a specific situation. Therefore, the in-band flag configuration unit 130 may detect introduction of the in-band interference signal in advance by detecting the impulsive noise.

Since the impulsive noise may occur due to various reasons, the occurrence of the impulsive noise does not always correspond to the occurrence of a noise due to the in-band interference signal. Therefore, the in-band flag configuration unit 130 may detect introduction of the in-band interference signal more accurately by using two factors relating to a preconfigured interference reference flag and a time point at which the impulsive noise occurs. A more specific method of configuring an in-band flag by using impulsive noise detection and the interference reference flag will be described again with reference to drawings below.

Meanwhile, the interference signal prediction unit 140 predicts introduction of the in-band interference signal according to the presence or absence of an in-band flag. For example, when an in-band flag is configured, the interference signal prediction unit 140 may predict that the in-band interference signal will be introduced thereafter. On the contrary, when the in-band flag is not configured, the interference signal prediction unit 140 may determine that the possibility of the in-band interference signal to be introduced will be low.

Therefore, when the transmission signal is divided into blocks in preconfigured time units and the interference reference flag is configured for a specific block, the corresponding interference reference flag may be repeatedly configured in the preconfigured time units described above. Alternatively, the in-band flag may also be repeatedly configured in the preconfigured time units. Accordingly, the radar signal processing device 100 may perform an avoidance operation by detecting introduction of the in-band interference signal in advance with reference to the in-band flag.

Hereinafter, each described operation of the present invention will be described in detail with reference to drawings.

Figure 2:
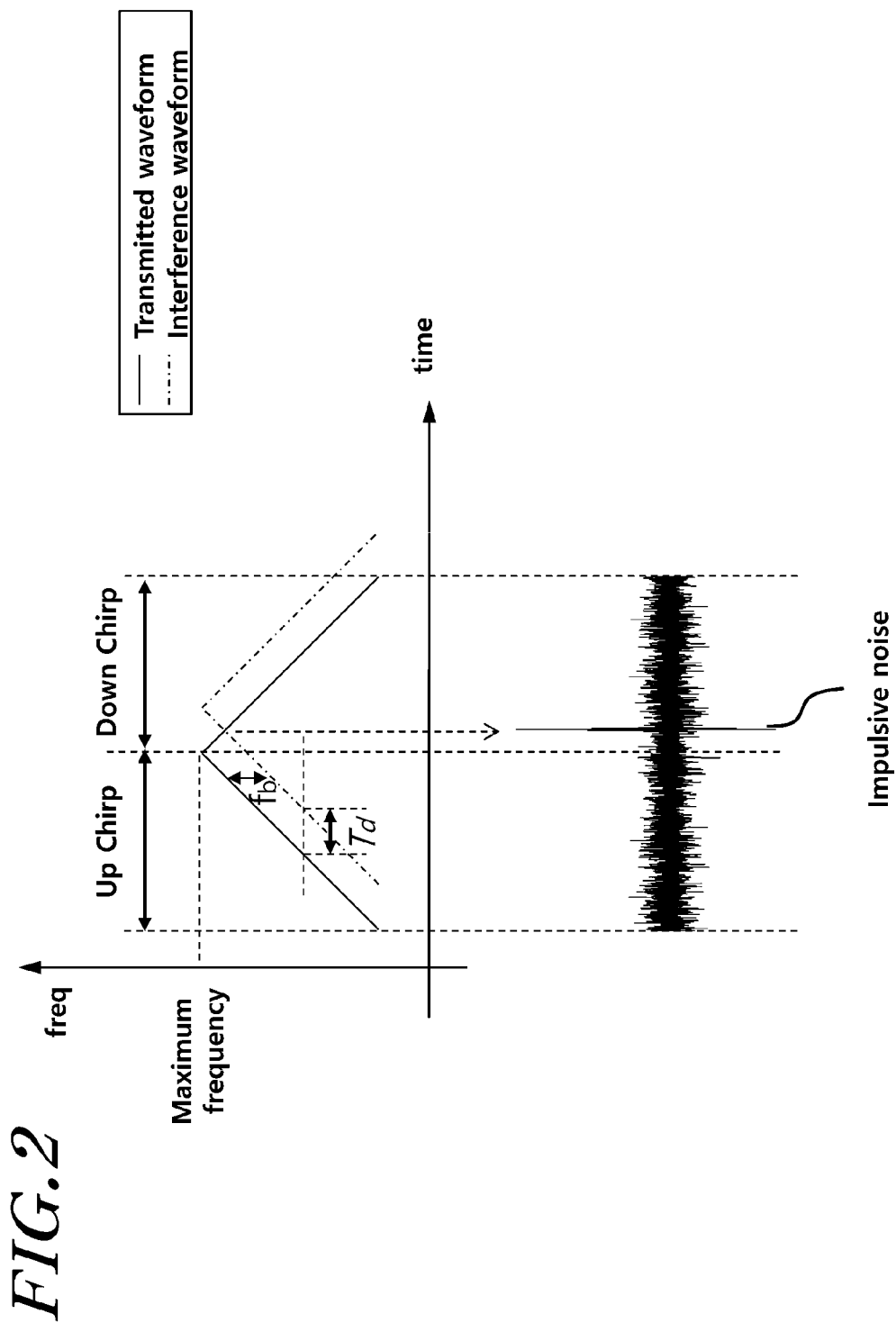
FIG. 2 is a drawing for explaining a phenomenon in which an impulsive noise occurs in a down-chirp interval according to an in-band interference signal according to an embodiment of the present invention.

FIG. 2 is a drawing for explaining a phenomenon in which an impulsive noise occurs in a down-chirp interval according to an in-band interference signal according to an embodiment of the present invention.

Referring to FIG. 2, an FMCW radar may be divided into an up-chirp interval in which a frequency increases along with time, and a down-chirp interval in which a frequency decreases along with time, with reference to a maximum frequency. A transmission signal waveform of such an FMCW radar is described as a triangular wave, and a triangular wave is repeatedly transmitted along with time. Meanwhile, an in-band interference signal may also be received in a triangular waveform in the same frequency band as that of the transmission signal. That is, when the in-band interference signal is introduced from the down-chirp interval, and a time difference (Td) between the transmission signal and the in-band interference signal occurs within a maximum reception signal delay time, a signal interference phenomenon occurs according to the in-band interference signal. That is, when a value of Td in FIG. 2 is smaller than the maximum reception signal delay time, an in-band interference phenomenon occurs due to the in-band interference signal.

Meanwhile, an impulsive noise occurs at a point where a waveform of the reception signal and a waveform of the interference signal are crossed, and an impulsive noise also occurs at a point where a frequency of the transmission signal and a frequency of the in-band interference signal are the same at an identical time when Td is the maximum reception signal delay time. Later, when the in-band interference signal is introduced and Td is narrowed within the maximum reception signal delay time, an interference phenomenon occurs. Therefore, in the down-chirp interval, the impulsive noise occurs in a front part thereof.

Figure 3:
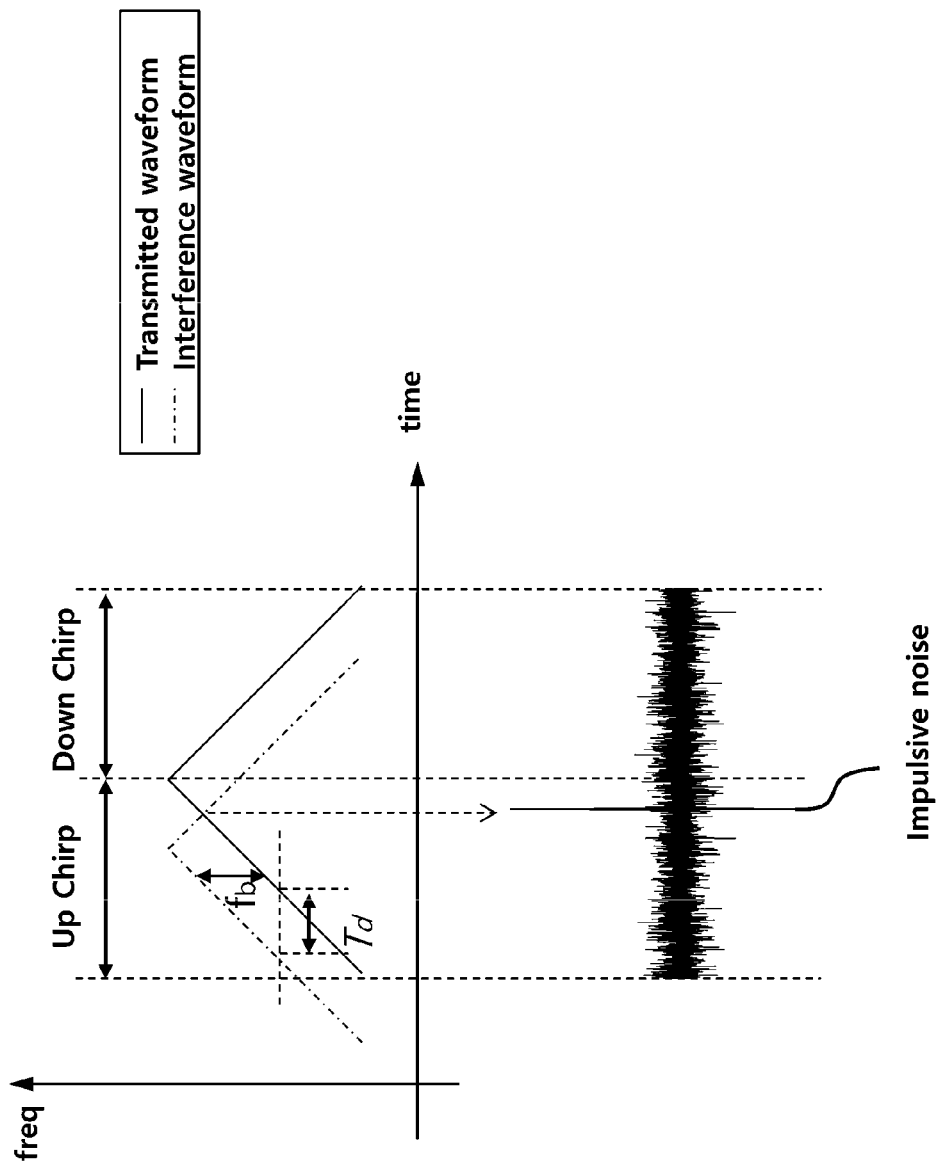
FIG. 3 is a drawing for explaining a phenomenon in which an impulsive noise occurs in an up-chirp interval according to an in-band interference signal according to an embodiment of the present invention.

FIG. 3 is a drawing for explaining a phenomenon in which an impulsive noise occurs in an up-chirp interval according to an in-band interference signal according to an embodiment of the present invention.

Referring to FIG. 3, an in-band interference phenomenon occurs when Td is within the maximum reception signal delay time even when an in-band interference signal is introduced from the up-chirp interval. Therefore, an impulsive noise occurs at a point where a frequency of the transmission signal and a frequency of the in-band interference signal are the same at an identical time when Td is the maximum reception signal delay time. Later, when the in-band interference signal is introduced in a direction of a maximum frequency of the transmission signal, and Td approaches within the maximum reception signal delay time, an interference phenomenon occurs. Therefore, in the up-chirp interval, the impulsive noise occurs in the rear part thereof.

Accordingly, when the in-band interference signal, which uses the same or similar frequency band as the transmission signal and has the same waveform as that of the transmission signal, is introduced within the maximum reception signal delay time, an interference phenomenon occurs between the in-band interference signal and the reception signal, that is the transmission signal reflected from a target and then received, thereby making it difficult to accurately detect a target and acquire target information. In other words, when waveform slopes of the transmission signal and the in-band interference signal are the same, and the in-band interference signal is introduced within the maximum reception signal delay time, an interference phenomenon occurs between the in-band interference signal and the reception signal, that is the transmission signal reflected from a target and then received, so that there may occur a problem in acquiring accurate target information.

As described above, in order to prevent such a problem in advance, the present invention provides a technology for preventing an interference phenomenon in the up-chirp interval and the down-chirp interval by detecting an impulsive noise.

Figure 4:
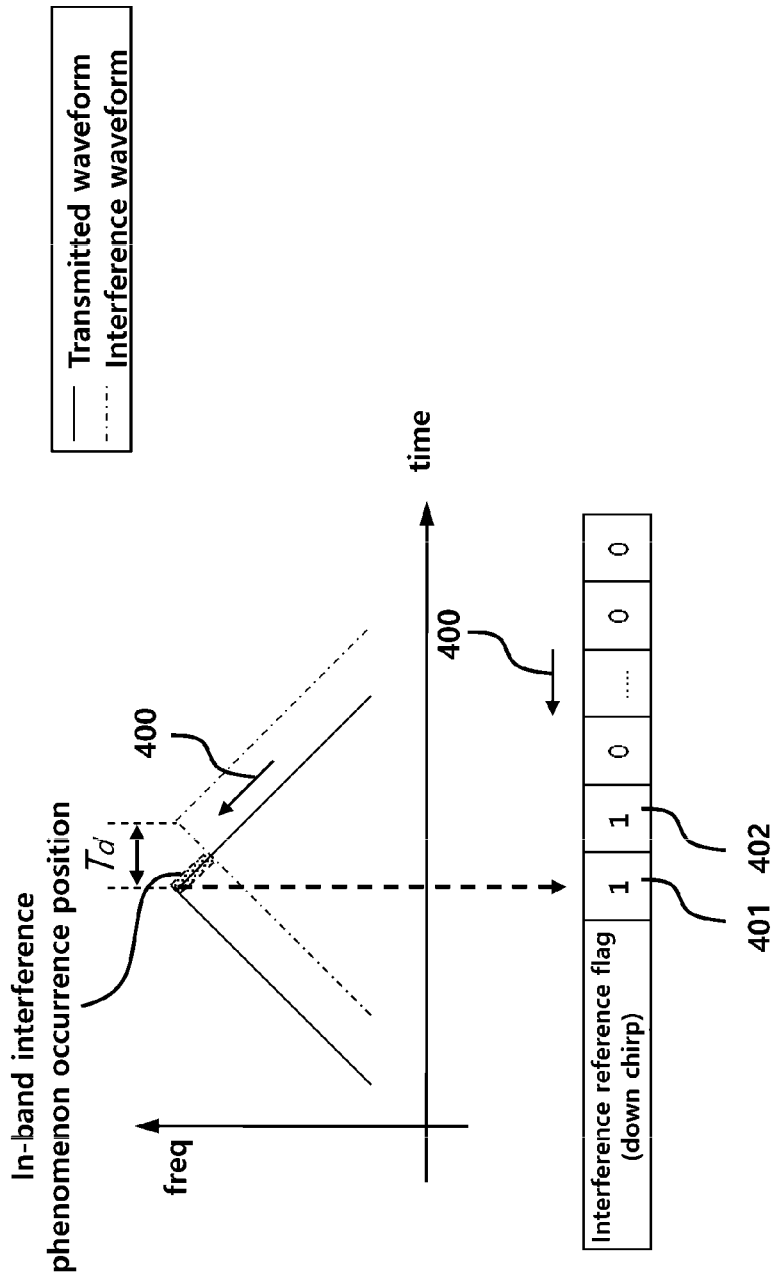
FIG. 4 is a drawing for explaining an operation of configuring an interference reference flag in a down-chirp interval according to an embodiment of the present invention.

FIG. 4 is a drawing for explaining an operation of configuring an interference reference flag in a down chirp interval according to an embodiment of the present invention.

The interference reference flag configuration unit 110 may configure an interference reference flag in each of the down-chirp interval and the up-chirp interval. Referring to FIG. 4, the interference reference flag configuration unit 110 configures an interference reference flag for a divided block in the down-chirp interval. For example, value 1 in each block corresponds to a block for which the interference reference flag is configured, and value 0 corresponds to a block for which the interference reference flag is not configured. The interference reference flag may be configured in various schemes according to configurations, and may be classified as ON or OFF.

As described with reference to FIG. 2 and FIG. 3, when the in-band interference signal is introduced from the down-chirp interval and Td is within the maximum reception signal delay time, an in-band interference phenomenon occurs. That is, the in-band interference phenomenon occurs when the in-band interference signal is introduced in an arrow direction 400 towards an in-band interference phenomenon occurrence position in FIG. 4. Meanwhile, an impulsive noise may occur at a point where the waveform of the transmission signal and the waveform of the in-band interference signal are crossed, and an impulsive noise may also occur at a point where a frequency of the transmission signal and a frequency of the in-band interference signal are the same when Td is the maximum reception signal delay time.

In the down-chirp interval of the transmission signal, the interference reference flag configuration unit 110 may configure the interference reference flag by selecting, as one or more specific blocks, a reference block 401 determined by using a time axis position with respect to a maximum frequency of the transmission signal and N continuous blocks 402 after the reference block. In FIG. 4, N is assumed to be 1. If N is 2, a reference block 401 and two blocks may be selected as specific blocks. Alternatively, N may be configured to be the number of the entire specific blocks including the reference block 401.

Meanwhile, as described above, a sensitivity of introduction of the in-band interference signal may vary according to value N. For example, when value N is configured to be low, and a specific block 402 is thus located within the in-band interference phenomenon occurrence position, an impulsive noise may be detected in the corresponding specific block 402 after an occurrence of an in-band interference phenomenon. On the other hand, when value N is configured to be high, and the specific block 402 is thus positioned at a point where the in-band interference phenomenon occurrence position starts, an occurrence of an interference phenomenon may be detected in advance by detecting the impulsive noise before the in-band interference signal is introduced towards the in-band interference phenomenon occurrence position. Therefore, value N may be determined based on one of the length of one block and an interference signal detection sensitivity.

When the impulsive noise is detected in a block for which the interference reference flag is configured, it is predicted that an in-band interference phenomenon will occur, and an operation for interference avoidance may thus be performed. That is, before the in-band interference signal is introduced from the down-chirp interval to the in-band interference phenomenon occurrence position, the introduction of the in-band interference signal may be detected in advance and an avoidance operation may be performed.

Figure 5:
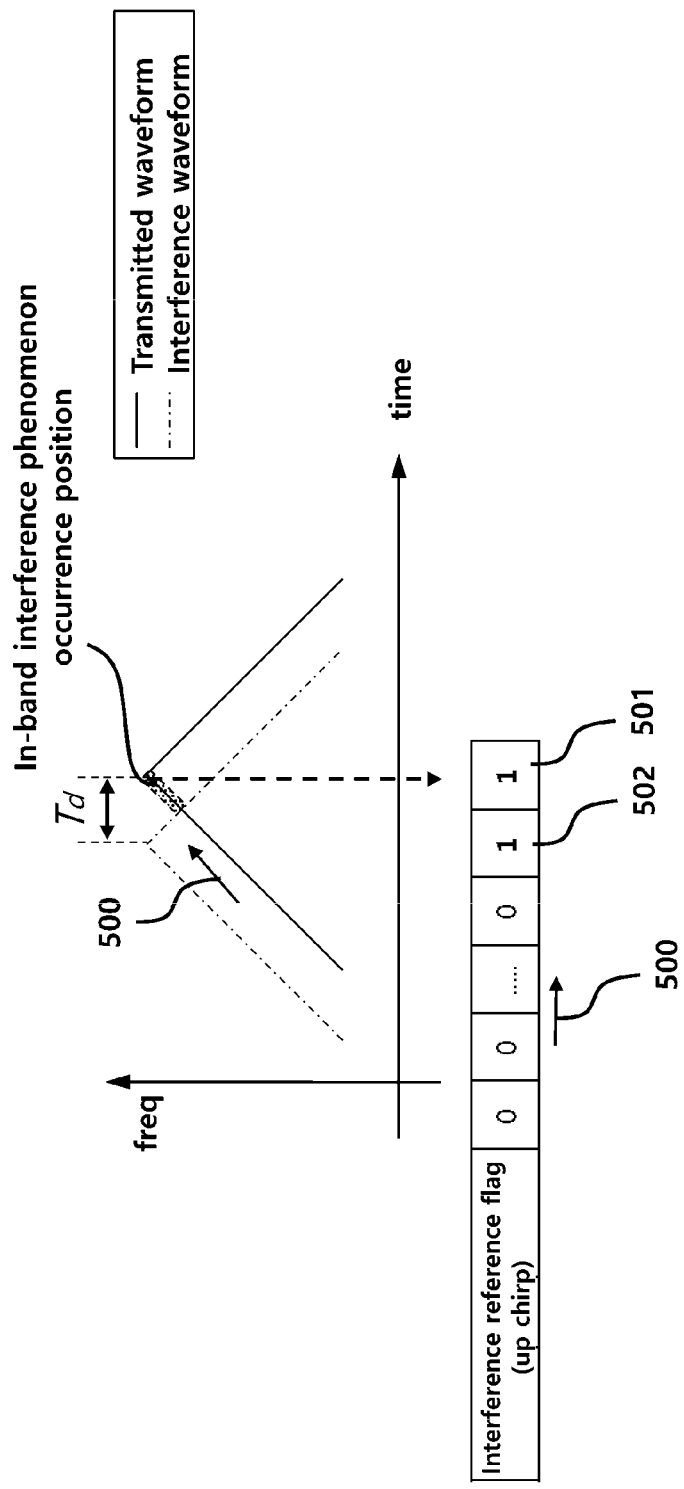
FIG. 5 is a drawing for explaining an operation of configuring an interference reference flag in an up-chirp interval according to an embodiment of the present invention.

FIG. 5 is a drawing for explaining an operation of configuring an interference reference flag in an up-chirp interval according to an embodiment of the present invention.

Referring to FIG. 5, in the up-chirp interval of the transmission signal, the interference reference flag configuration unit 110 may configure the interference reference flag by selecting, as one or more specific blocks, a reference block 501 determined by using a time axis position with respect to the maximum frequency of the transmission signal and M continuous blocks 502 before the reference block. For example, the in-band interference signal may be introduced from the up-chirp interval in an arrow direction 500. In this case, an impulsive noise may occur in the rear part of the up-chirp interval. Therefore, the interference reference flag configuration unit 110 may configure the interference reference flag for the reference block 501 determined by using a time axis position with respect to the maximum frequency of the transmission signal and M continuous blocks 502 before the corresponding reference block. M is a natural number, and may be determined by at least one of the length of a block and an interference signal detection sensitivity. In FIG. 5, M is assumed to be 1.

For example, in a case where block 502 is configured for a first part of the in-band interference phenomenon occurrence position, and when the in-band interference signal is introduced in the arrow direction 500, an impulsive noise may be detected in block 502. Therefore, the occurrence of the interference phenomenon may be prevented through an avoidance operation before the in-band interference signal enters within the in-band interference phenomenon occurrence position. If block 502 is configured to be within the in-band interference phenomenon occurrence position, and when the impulsive noise is detected, an in-band interference phenomenon may have already started. Therefore, value M may be properly tuned by using a block length and an interference signal detection sensitivity in order to efficiently predict an in-band interference phenomenon.

In FIG. 4 and FIG. 5, descriptions have been made through an example of a case where the reference block is determined to be a block including the time axis position of the maximum frequency. However, the reference block may be differently configured by using the time axis position of the maximum frequency and the maximum reception signal delay time. For example, the reference block may be configured to include a start point of the in-band interference phenomenon occurrence position. In this case, it is advantageous that introduction of the in-band interference signal may be detected before the in-band interference signal is introduced in the in-band interference phenomenon occurrence position, and the interference signal detection sensitivity may increase. Particularly, in the down-chirp interval, the reference block may be determined to be a block positioned to be spaced apart from the time axis position of the maximum frequency of the transmission signal by a half of the maximum reception signal delay time. That is, the reference block may be determined to be a block immediately before the introduction of the in-band interference signal to the in-band interference phenomenon occurrence position. Similarly, in the up-chirp interval, a reference block may be determined to be a block positioned to be spaced apart from the time axis position of the maximum frequency of the transmission signal by a half of the maximum reception signal delay time. That is, when the reference block is configured for a start point of the in-band interference phenomenon occurrence position, and value N and value M are configured to be large, introduction of the in-band interference signal may be predicted even when the in-band interference signal is positioned to be spaced far from the in-band interference phenomenon occurrence position.

A method of determining a reference block may be dynamically determined, and the present invention has no limit relating thereto.

Figure 6:
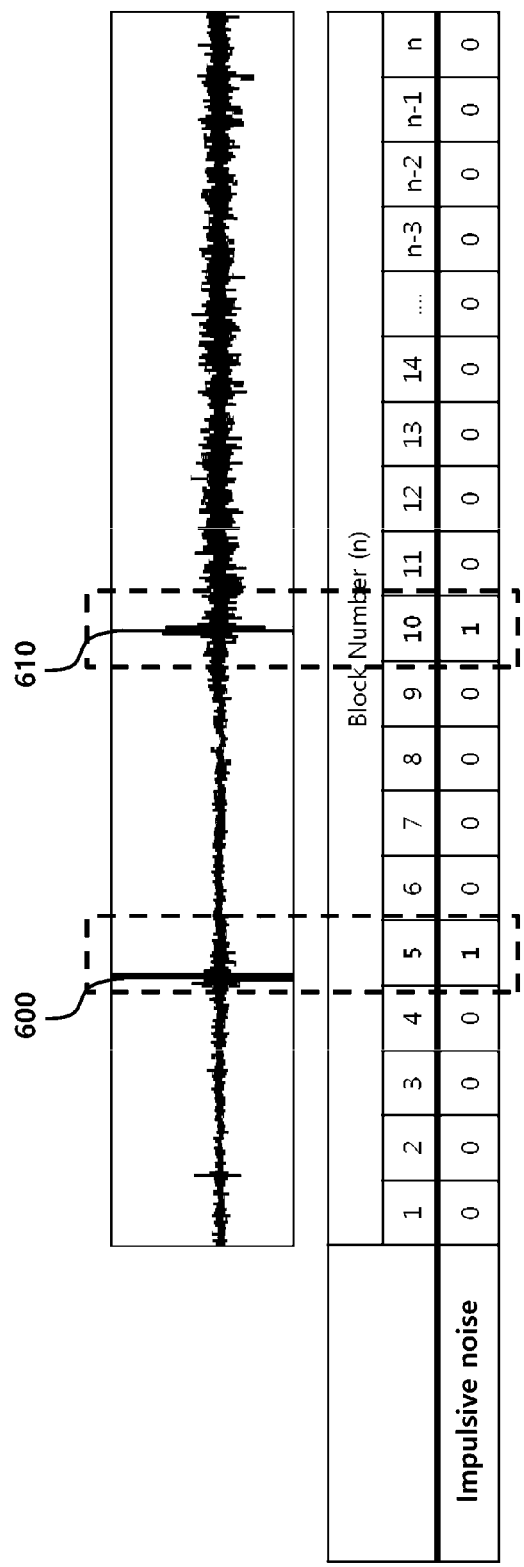
FIG. 6 is a drawing for explaining an operation of detecting an impulsive noise according to an embodiment of the present invention.

FIG. 6 is a drawing for explaining an operation of detecting an impulsive noise according to an embodiment of the present invention.

Referring to FIG. 6, the impulsive noise detection unit 120 may detect occurrences of impulsive noises 600 and 610 by using the reception signal. Determination on whether the impulsive noise exists may be made using information on whether a peak equal to or greater than a preconfigured reference value occurs. Alternatively, the determination may be made with reference to whether a peak relative to the size of the reception signal occurs. Various schemes which have been conventionally used may be applied to determination on impulsive noise occurrence, and the present invention has no limit relating to a method for determining occurrence of an impulsive noise.

A block in which an impulsive noise occur may be checked in order to match a point at which the impulsive noise occurs with a block of the transmission signal. That is, the impulsive noise of peak 600 may be determined to occur in block 5, and the impulsive noise of peak 610 may be determined to occur in block 6. A flag for marking an occurrence of an impulsive noise may be configured for each block.

Figure 7:
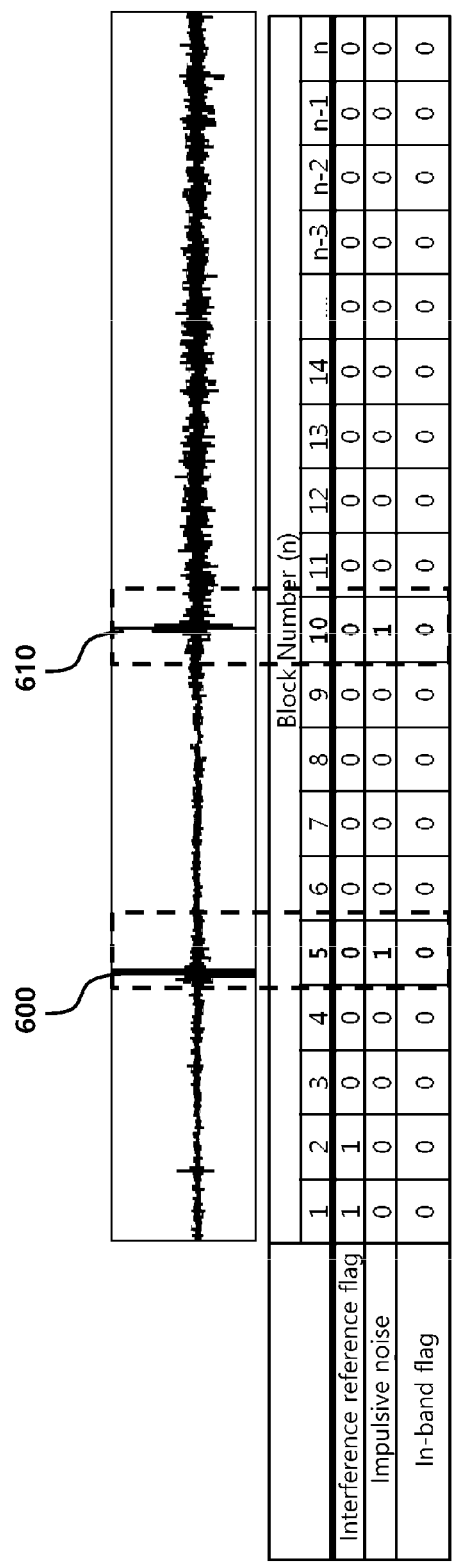
FIG. 7 is a drawing illustrating an example for explaining an in-band flag configuration according to an embodiment of the present invention.

FIG. 7 is a drawing illustrating an example for explaining an in-band flag configuration according to an embodiment of the present invention.

The in-band flag configuration unit 130 of the present invention may configure an in-band flag for a specific block, for which the interference reference flag is configured, when an impulsive noise is detected in the corresponding block.

Referring to FIG. 7, detection of an impulsive noise is marked in block 5 and block 10 according to detection of two impulsive noises 600 and 601. However, the interference reference flag is configured only for block 1 and block 2.

Therefore, the in-band flag configuration unit 130 checks whether the interference reference flag is configured for block 5 and block 10, in which impulsive noises 600 and 610 are detected, and does not configure an in-band flag for block 5 and block 10. In other words, since the corresponding impulsive noises 600 and 610 are determined to be irrelevant to an in-band interference phenomenon, the in-band flag configuration unit 130 does not configure an in-band flag for block 5 and block 10.

However, as described above, since the number of specific blocks, for which the interference reference flag is configured, may be dynamically determined, the in-band flag may be configured to be 1 for block 5 when N or M value is configured to be large and the interference reference flag is thus configured for block 1 to block 5. In this case, it is determined that the impulsive noise 600 detected in block 5 may generate an in-band interference phenomenon, so that an avoidance operation of the transmission signal may be performed. Likewise, a sensitivity of in-band interference phenomenon detection may be determined according to a configuration of N or M value.

Figure 8:
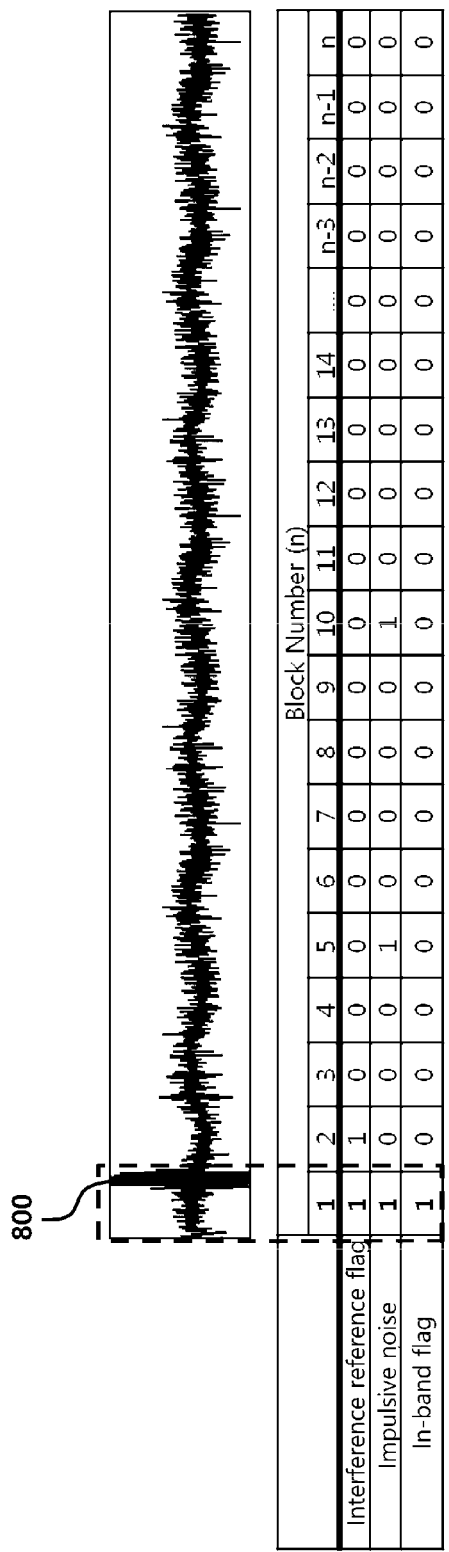
FIG. 8 is a drawing illustrating another example for explaining an in-band flag configuration according to an embodiment of the present invention.

FIG. 8 is a drawing illustrating another example for explaining an in-band flag configuration according to an embodiment of the present invention.

According to FIG. 8, an impulsive noise 800 of FIG. 8 is detected in block 1, and the interference reference flag is configured for block 1 and block 2. Therefore, the in-band flag configuration unit 130 configures an in-band flag for block 1. In addition, an impulsive noise may be detected in block 5 and block 10. In this case, since the interference reference flag is not configured for block 5 and block 10, an in-band flag is not configured for block 5 and block 10. That is, as described above, since an impulsive noise may occur not only in a case where an in-band interference signal is introduced but also at a point where a frequency of the transmission signal and a frequency of the interference signal are crossed, the impulsive noise may be detected in block 5 and block 10. However, since an impulsive noise of a block, for which the interference reference flag is not configured, has no possibility to be associated with occurrence of an in-band interference signal, an in-band flag is not configured.

Accordingly, the in-band flag configuration unit 130 of the present invention may provide effects capable of preventing impulsive noise detection due to an error, or a malfunction caused by an impulsive noise irrelevant to the in-band interference signal, and dynamically adjust an interference signal detection sensitivity by adjusting the number of specific blocks for which the interference reference flag is configured, by configuring an in-band flag using a detection position of the impulsive noise and the interference reference flag.

Meanwhile, the interference signal prediction unit 140 may predict that an in-band interference signal will be introduced when a block for which an in-band flag is configured is detected. That is, the interference signal prediction unit 140 may predict that an in-band interference phenomenon will occur when a block for which an in-band flag is configured is detected.

The radar signal processing device 100 may control a transmission signal to avoid occurrence of an interference signal when it is predicted that an in-band interference phenomenon will occur. Description relating to this will be provided below with reference to FIG. 9 to FIG. 12.

Figure 9:
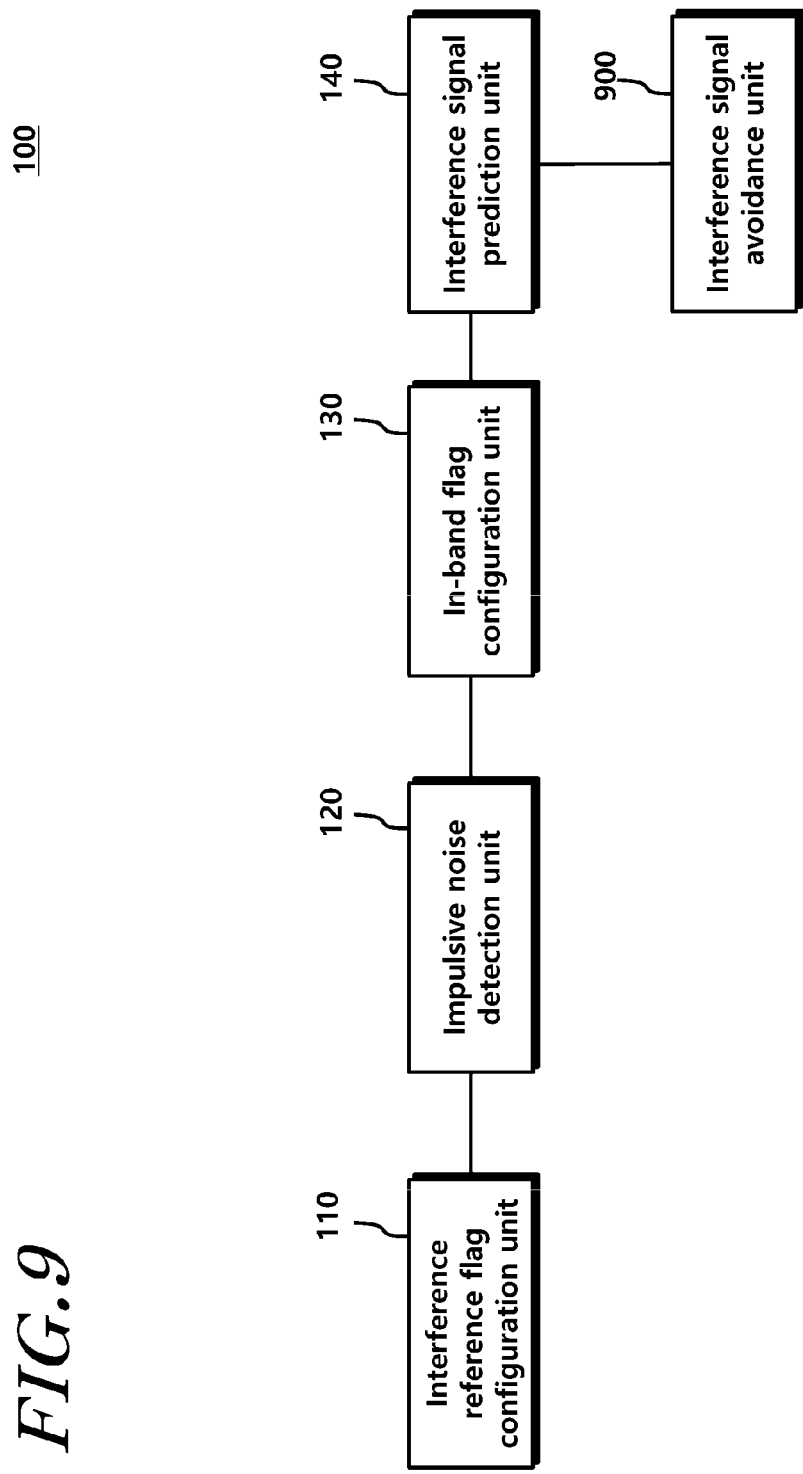
FIG. 9 is a drawing for explaining a configuration of a radar signal processing device, including a configuration for interference signal avoidance according to an embodiment of the present invention.

FIG. 9 is a drawing for explaining a configuration of a radar signal processing device, including a configuration for interference signal avoidance according to an embodiment of the present invention.

Referring to FIG. 9, the radar signal processing device 100 according to an embodiment of the present invention may further include an interference signal avoidance unit 900 that controls the transmission signal to be frequency-hopped or time-hopped by applying a hopping parameter when introduction of an in-band interference signal is predicted. Further, the interference reference flag configuration unit 110, the impulsive noise detection unit 120, the in-band flag configuration unit 130, and the interference signal prediction unit 140 may perform all operations described with reference to FIG. 1 to FIG. 8.

The interference signal avoidance unit 900 may avoid an interference phenomenon in advance through frequency hopping or time hopping of the transmission signal when introduction of an in-band interference signal is predicted. To this end, the interference signal avoidance unit 900 may perform frequency hopping or time hopping by applying a hopping parameter to the transmission signal. Further, frequencies or times of the transmission signal and the in-band interference signal are spaced apart from each other according to the hopping of the transmission signal, and an interference phenomenon may thus be prevented.

Particularly, the hopping parameter used for hopping the transmission signal may have a system parameter predetermined by a system, and a random parameter that is randomly generated. The hopping parameter may be generated according to a configuration of an in-band flag when the in-band flag is configured.

Figure 10:
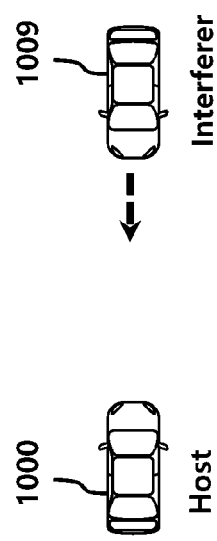
FIG. 10 is a drawing for explaining an operation of applying a hopping parameter for interference signal avoidance according to an embodiment of the present invention.

FIG. 10 is a drawing for explaining an operation of applying a hopping parameter for interference signal avoidance according to an embodiment of the present invention.

In FIG. 10, description is provided based on time hopping on assumption that a radar is installed in a vehicle, but the same case may be applied to frequency hopping.

Referring to FIG. 10, a hopping parameter may be differently generated according to whether a block for which an in-band flag is configured corresponds to an up-chirp interval or in a down-chirp interval of the transmission signal. For example, in a case where an interference vehicle 1009 transmits a radar signal while proceeding in a direction of a host vehicle 1000, both vehicles 1000 and 1009 may detect each other's radar transmission signals as an in-band interference signal through the radar signal processing device 100.

In this case, when an in-band flag is configured for the down-chirp block with reference to the host vehicle 1000, the interference vehicle 1009 may have an in-band flag configured for the up-chirp block. Therefore, a system parameter constituting the hopping parameter may be determined to be value x in a case of the host vehicle 1000, and may be determined to be value y in a case of the interference vehicle 1009. A random parameter may be configured to be $\alpha 1$ in a case of the host vehicle 1000, and may be configured to be $\alpha 2$ in a case of the interference vehicle 1009.

On the contrary, when an in-band flag is configured for the up-chirp block with reference to the host vehicle 1000, the interference vehicle 1009 may have an in-band flag configured for the down-chirp block. Therefore, the system parameter constituting the hopping parameter may be determined to be value y in a case of the host vehicle 1000, and may be determined to be value x in a case of the interference vehicle 1009. The random parameter may be configured to be $\alpha 2$ in a case of the host vehicle 1000, and may be configured to be $\alpha 1$ in a case of the interference vehicle 1009.

Therefore, an interference phenomenon due to mutual in-band interference signals may be prevented by delaying and then transmitting, by both the host vehicle 1000 and the interference vehicle 1009, transmission signals by a preconfigured hopping parameter.

For another example, when only the host vehicle 1000 has the radar signal processing device 100, only the host vehicle 1000 may configure a hopping parameter according to a chirp interval for which an in-band flag is configured.

In summary, the system parameter constituting the hopping parameter may be determined to be a preconfigured first value (value x in FIG. 10) when a block, for which an in-band flag is configured, is positioned in the down-chirp interval of the transmission signal, and may be determined to be a preconfigured second value (value y in FIG. 10) when the block, for which the in-band flag is configured, is positioned in the up-chirp interval of the transmission signal. In addition, the random parameter may be randomly determined. Meanwhile, an absolute value obtained by subtracting the second value from the first value may be configured to exceed a value of the maximum reception signal delay time for detecting a reception signal that is the transmission signal reflected from a target and then received. Accordingly, the interference phenomenon due to the in-band interference signal may be properly prevented. The first value and the second value may be fixed values according to the system configuration, and a valid hopping operation may be applied through the random parameter even when the host vehicle 1000 and the interference vehicle 1009 are synchronized.

Figure 11:
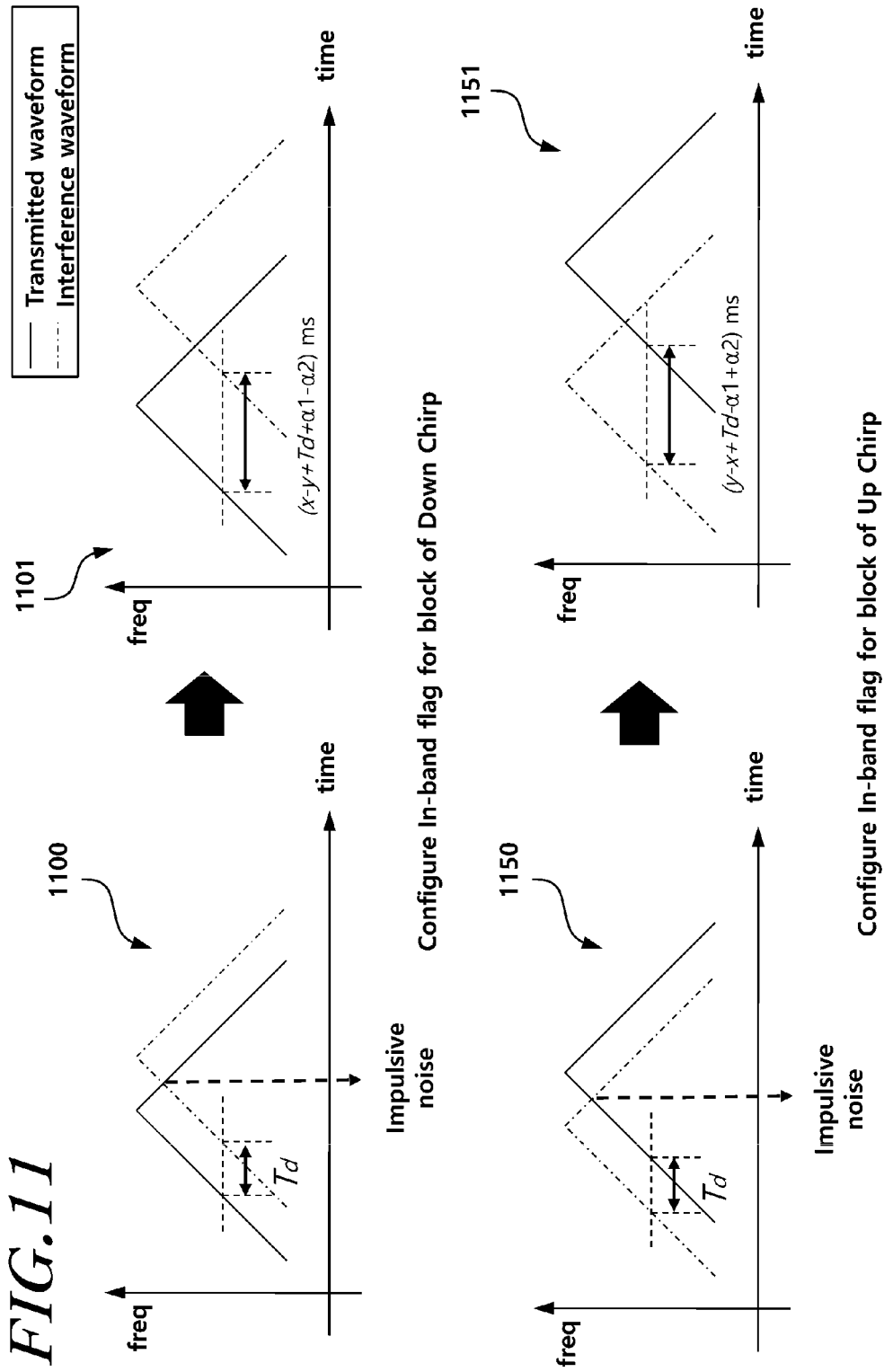
FIG. 11 is a drawing illustrating an example for explaining an interference signal avoidance effect before and after applying a hopping parameter depending on a position of a block, for which an in-band flag is configured, according to an embodiment of the present invention.
Figure 12:
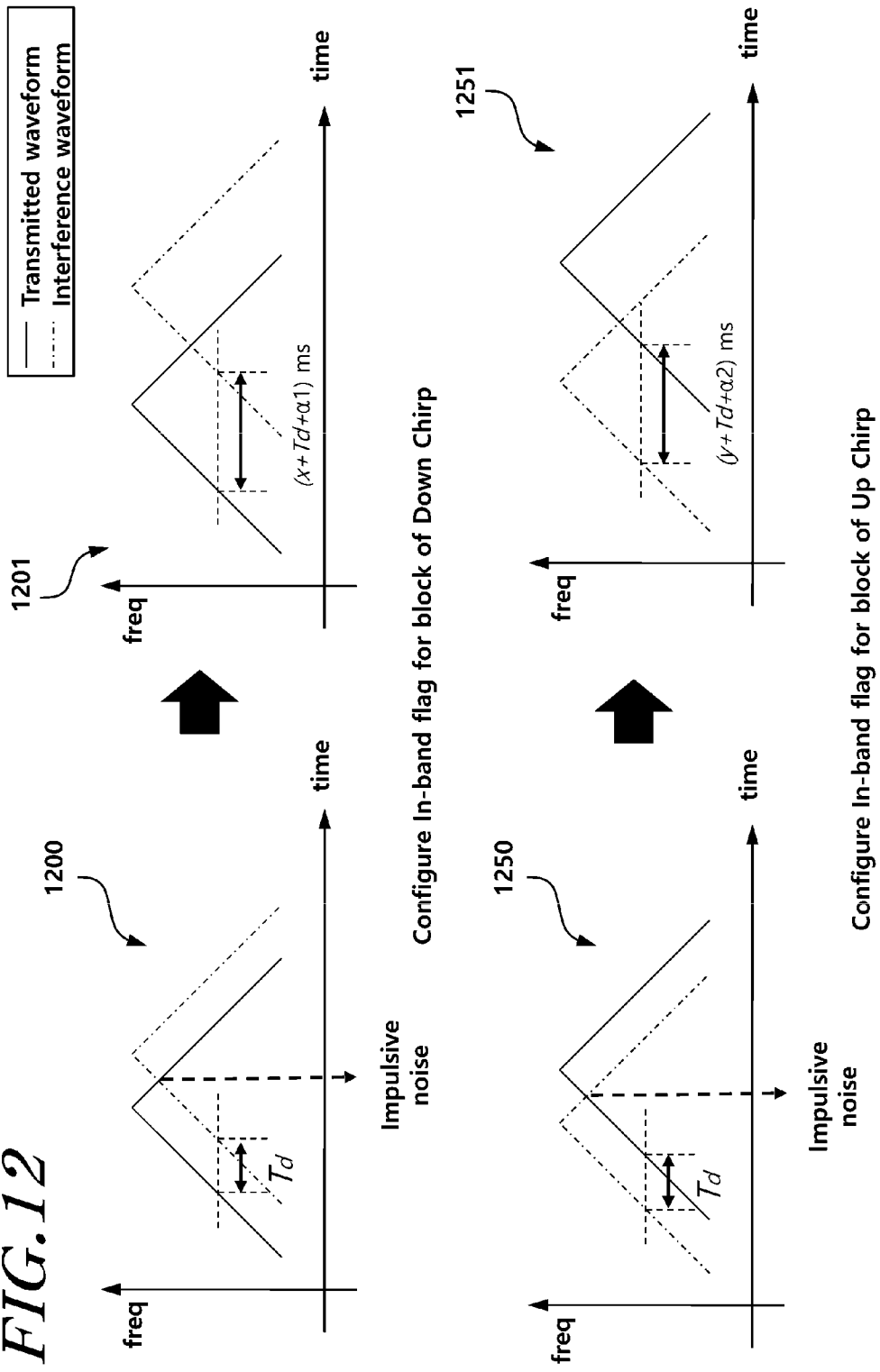
FIG. 12 is a drawing illustrating another example for explaining an interference signal avoidance effect before and after applying a hopping parameter depending on a position of a block, for which an in-band flag is configured, according to an embodiment of the present invention.

FIG. 11 and FIG. 12 illustrate a result of avoiding an interference phenomenon by using the hopping parameter of FIG. 10 even when an in-band interference phenomenon occurs.

FIG. 11 is a drawing illustrating an example for explaining an interference signal avoidance effect before and after applying a hopping parameter depending on a position of a block, for which an in-band flag is configured, according to an embodiment of the present invention. In FIG. 11, it is assumed that both the host vehicle 1000 and the interference vehicle 1009 have the radar signal processing device 100.

Referring to FIG. 11, in a case 1100 where an impulsive noise occurs due to introduction of an in-band interference signal from the down-chirp interval, it may be checked that an interference phenomenon is prevented according to a result 1101 of performing hopping by applying the previously described system parameters and random parameters. Particularly, when Td is within the maximum reception signal delay time, an interference phenomenon due to introduction of the in-band interference signal occurs 1100. In this case, when the system parameters x and y, and the random parameters $\alpha 1$ and $\alpha 2$ are applied, a Td value is changed to a value corresponding to $x-y+Td+\alpha 1-\alpha 2$, so that the interference phenomenon is avoided 1101.

Similarly, in a case 1150 where an impulsive noise occurs due to introduction of an in-band interference signal from the up-chirp interval, it may be checked that the interference phenomenon is prevented according to a result 1151 of performing hopping by applying the previously described system parameters and random parameters. Particularly, when Td is within the maximum reception signal delay time, an interference phenomenon due to introduction of the in-band interference signal occurs 1150. In this case, when the system parameters x and y, and the random parameters $\alpha 1$ and $\alpha 2$ are applied, a Td value is changed to a value corresponding to $y-x+Td-\alpha 1+\alpha 2$, so that the interference phenomenon is avoided 1151.

FIG. 12 is a drawing illustrating another example for explaining an interference signal avoidance effect before and after applying a hopping parameter depending on a position of a block, for which an in-band flag is configured, according to an embodiment of the present invention. In FIG. 12, it is assumed that only the host vehicle 1000 has the radar signal processing device 100.

Referring to FIG. 12, in a case 1200 where an impulsive noise occurs due to introduction of an in-band interference signal from the down-chirp interval, it may be checked that an interference phenomenon is prevented according to a result 1201 of performing hopping by applying the previously described system parameter and random parameter. Particularly, when Td is within the maximum reception signal delay time, an interference phenomenon due to introduction of the in-band interference signal occurs 1200. In this case, when the system parameter x, and the random parameter $\alpha 1$ are applied, a Td value is changed to a value corresponding to $x+Td+\alpha 1$, so that the interference phenomenon is avoided 1201.

Similarly, in a case 1250 where an impulsive noise occurs due to introduction of an in-band interference signal from the up-chirp interval, it may be checked that the interference phenomenon is prevented according to a result 1251 of performing hopping by applying the previously described system parameter and random parameter. Particularly, when Td is within the maximum reception signal delay time, an interference phenomenon due to introduction of the in-band interference signal occurs 1250. In this case, when the system parameter y, and the random parameter $\alpha 2$ are applied, a Td value is changed to a value corresponding to $y+Td+\alpha 2$, so that the interference phenomenon is avoided 1251.

Accordingly, the interference signal avoidance unit 900 may prevent introduction of an in-band interference signal by hopping the transmission signal by using a hopping parameter.

A radar signal processing method to which all operations of the present invention, which have been described with reference to FIG. 1 to FIG. 12, may be applied will be described with reference to drawings.

Figure 13:
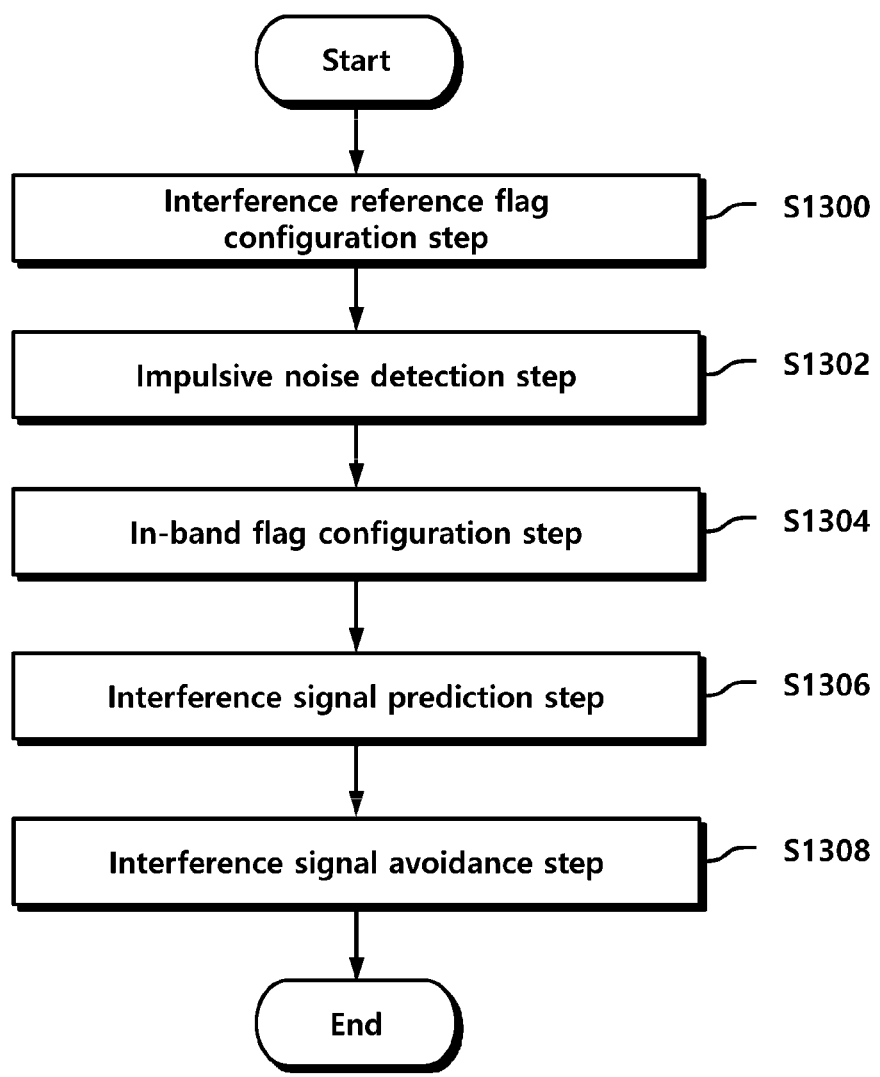
FIG. 13 is a drawing for explaining a radar signal processing method according to an embodiment of the present invention.

FIG. 13 is a drawing for explaining a radar signal processing method according to an embodiment of the present invention.

A radar signal processing method according to an embodiment of the present invention includes: an interference reference flag configuration step of dividing a transmission signal into a plurality of blocks in preconfigured time units on a time axis, and configuring an interference reference flag for one or more specific blocks selected among the plurality of blocks; an impulsive noise detection step of detecting whether an impulsive noise occurs in each of the plurality of blocks, by using a reception signal; an in-band flag configuration step of configuring an in-band flag by using the interference reference flag and a block in which an impulsive noise is detected; and an interference signal prediction step of predicting introduction of an in-band interference signal according to whether an in-band flag exists.

Referring to FIG. 13, the radar signal processing method may include an interference reference flag configuration step S1300 of dividing a transmission signal into a plurality of blocks in preconfigured time units on a time axis, and configuring an interference reference flag for one or more specific blocks selected among the plurality of blocks. The interference reference flag configuration step includes dividing a transmission signal into preconfigured time units, and dividing the transmission signal of the corresponding time unit into a plurality of blocks on a time axis. In addition, determination on whether to configure an interference reference flag for each of the plurality of divided blocks may be made, and the interference reference flag may be configured for one or more selected specific blocks. Further, the interference reference flag configuration step includes determining whether to configure the interference reference flag for each divided block. The interference reference flag is used as one factor for determining an in-band flag configuration according to whether an impulsive noise is detected.

In addition, the interference reference flag configuration step may include configuration of one or more intervals of an up-chirp and a down-chirp when description is made with reference to one period (e.g., one triangular wave) of an FMCW transmission signal. Further, the interference reference flag configuration step may include selecting specific blocks, for which the interference reference flag is configured, to be continuous when selecting the specific blocks. For example, when two specific blocks are selected in the up-chirp interval, the two specific blocks are continuous in time. Likewise, when three specific blocks are selected in the down-chirp interval, the three specific blocks are continuous in time.

Meanwhile, the interference reference flag configuration step may include using various factors in selecting a specific block for which the interference reference flag is configured. For example, the interference reference flag configuration step may include configuring a specific block, for which the interference reference flag will be configured, by using, as a factor, at least one piece of information among information of a time axis position with respect to a maximum frequency of the transmission signal, information of a maximum reception signal delay time for detecting a reception signal, that is the transmission signal reflected from a target and then received, preconfigured interference signal detection sensitivity information, and chirp interval information of the transmission signal.

For example, the interference reference flag configuration step may include configuring the interference reference flag by selecting, as one or more specific blocks, a reference block determined by using the time axis position with respect to the maximum frequency of the transmission signal and N continuous blocks after the reference block, in the down-chirp interval of the transmission signal. For another example, the interference reference flag configuration step may include configuring the interference reference flag by selecting, as one or more specific blocks, a reference block determined by using the time axis position with respect to the maximum frequency of the transmission signal and M continuous blocks before the reference block. Here, N and M are natural numbers, and their values may be determined according to interference signal sensitivity information relating to a degree of sensitivity in detecting an interference signal.

In addition, the radar signal processing method may include an impulsive noise detection step S1302 of detecting whether an impulsive noise occurs in each of the plurality of blocks, by using the reception signal. The impulsive noise detection step may include analyzing the reception signal to check whether an impulsive noise occurs. For example, the impulsive noise corresponds to a peak component occurring in a time domain of the reception signal, and increases a noise level (noise floor level) in a frequency domain. The impulsive noise may occur according to various occurrence conditions. For example, the impulsive noise may occur at a point where a waveform of the transmission signal and a waveform of the interference signal are crossed. Therefore, even in a case where an interference signal is introduced, the impulsive noise may occur when the transmission signal and the in-band interference signal have an identical frequency value at a specific time point. Therefore, the impulsive noise detection step may include monitoring through signal processing whether the impulsive noise occurs, and checking to which block among the previously described transmission signal blocks the time point at which the impulsive noise occurs belongs.

The radar signal processing method may include an in-band flag configuration step S1304 of configuring an in-band flag by using a block in which the impulsive noise is detected and the interference reference flag. The in-band flag configuration step may include configuring an in-band flag by using a block in which the impulsive noise is detected and the interference reference flag. The in-band flag configuration step may include determining whether to configure the in-band flag for a block, in which an impulsive noise is detected, by using interference reference flag information of the corresponding block when the impulsive noise is detected. For example, the in-band flag configuration step may include configuring the in-band flag for the block in which the impulsive noise is detected when occurrence of the impulsive noise is detected in the specific block for which the interference reference flag is configured. Accordingly, it may be detected in advance that there is a possibility in which the in-band interference signal is introduced after the corresponding block.

Particularly, it is possible that the impulsive noise may occur at the part where the waveform of the transmission signal and the waveform of the interference signal are crossed, and a position at which the in-band interference signal will occur exists at the part where the waveforms are crossed. That is, when the in-band interference signal occurs, the impulsive noise may always be involved. However, an out-band interference signal is generated when a time axis interval between the transmission signal and the reception signal is formed to have a value equal to or greater than a specific value, and an in-band interference signal is generated when the time axis interval is formed to have a value smaller than a specific value. Therefore, when the in-band interference signal is introduced from the up-chirp or down-chirp interval of the transmission signal, an impulsive noise is involved. That is, when the impulsive noise occurs, a noise according to the in-band interference signal may occur in a specific situation. Therefore, the in-band flag configuration step may include detecting introduction of the in-band interference signal in advance by detecting the impulsive noise.

Since the impulsive noise may occur due to various reasons, the occurrence of the impulsive noise does not always correspond to the occurrence of a noise due to the in-band interference signal. Therefore, the in-band flag configuration step may include detecting introduction of the in-band interference signal more accurately by using two factors relating to a preconfigured interference reference flag and a time point at which the impulsive noise is detected.

The radar signal processing method may include an interference signal prediction step S1306 of predicting introduction of an in-band interference signal according to whether an in-band flag exists. The interference signal prediction step includes predicting introduction of an in-band interference signal according to whether an in-band flag exists. For example, when the in-band flag is configured, the interference signal prediction step may include predicting that the in-band interference signal will be introduced thereafter.

Meanwhile, when the transmission signal is divided into blocks in preconfigured time units and the interference reference flag is configured for a specific block, the corresponding interference reference flag may be repeatedly configured in the preconfigured time units described above. Alternatively, the in-band flag may also be repeatedly configured in the preconfigured time units. Accordingly, the radar signal processing device 100 may detect introduction of the in-band interference signal in advance with reference to the in-band flag.

Upon necessity, the radar signal processing method may further include an interference signal avoidance step S1308 of controlling the transmission signal to be frequency-hopped or time-hopped by applying a hopping parameter when introduction of the in-band interference signal is predicted. When introduction of the in-band interference signal is predicted, the interference signal avoidance step may include performing hopping by applying a hopping parameter having a preconfigured system parameter and a random parameter to the transmission signal. As previously described, the system parameter is determined to have different values depending on a chirp interval to which the block, for which the in-band flag is configured, corresponds among the up-chirp interval and the down-chirp interval of the transmission signal, and the random parameter is randomly determined. For example, the system parameter is determined to be a preconfigured first value when the block, for which the in-band flag is configured, is positioned in the down-chirp interval of the transmission signal, and is determined to be a preconfigured second value when the block, for which the in-band flag is configured, is positioned in the up-chirp interval of the transmission signal. An absolute value obtained by subtracting the second value from the first value may be configured to exceed a value of the maximum reception signal delay time for detecting the reception signal that is the transmission signal reflected from a target and then received.

Meanwhile, the hopping parameter may be determined and generated in the in-band flag configuration step, or may be previously generated and then stored. Alternatively, the hopping parameter may be determined or generated in one of the previously described steps S1300 to S1308.

FIG. 14 is a drawing for explaining an operation of updating an in-band flag in a radar signal processing procedure according to an embodiment of the present invention.

Referring to FIG. 14, in relation to the radar signal processing device 100 and the radar signal processing method, it may be checked whether an in-band flag exists, and then a hopping operation for avoiding an interference signal may be performed.

For example, it may be checked S1400 whether an in-band flag exists in a block for transmitting the transmission signal. When the in-band flag exists, a hopping operation using a hopping parameter may be performed S1410 in order to avoid introduction of an interference signal. If, the in-band flag does not exist in the corresponding block, the transmission signal is transmitted and the reception signal is received S1420.

When the reception signal is received, it is checked S1430 whether an impulsive noise is detected. When an impulsive noise is not detected, signal processing for target detection and target information check is performed S1460 by using the reception signal. On the other hand, when an impulsive noise is detected, it is checked S1440 whether the interference reference flag is configured for the block. That is, as previously described, introduction of an in-band interference signal is predicted by checking whether the interference reference flag is configured for the block in which the impulsive noise is detected.

When the interference reference flag is not configured for the block in which an impulsive noise is detected, it is determined that no introduction of the in-band interference signal is detected, and signal processing for target detection and target information check is thus performed S1460. If the interference reference flag is configured for the block in which an impulsive noise is detected, the in-band flag is updated by configuring the in-band flag for the corresponding block S1450.

Accordingly, in relation to a radar signal processing device and method, introduction of an in-band interference signal may be detected in advance and an avoidance operation may thus be performed.

As described hereinabove, the present invention provides an effect capable of preventing an occurrence of interference due to an in-band interference signal, by detecting introduction of the in-band interference signal in advance. Further, the present invention provides an effect of increasing a probability of avoidance in comparison with a random avoidance method and preventing unnecessary use of a resource, by detecting introduction of the in-band interference signal and avoiding the in-band interference signal.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention. Although a preferred embodiment of the present invention has been described for illustrative purposes, those skilled in the art will appreciate that various modifications, additions and substitutions are possible, without departing from the scope and spirit of the present invention as described in the accompanying claims. The scope of the present invention shall be construed on the basis of the accompanying claims in such a manner that all of the technical ideas included within the scope equivalent to the claims belong to the present invention.

What is claimed is:

1. A radar signal processing device comprising:
   an interference reference flag configuration unit configured to divide a transmission signal into a plurality of blocks in a preconfigured time units on a time axis, and configure an interference reference flag for one or more specific blocks selected among the plurality of blocks;
   an impulsive noise detection unit configured to detect whether an impulsive noise occurs in each of the plurality of blocks, by using a reception signal;
   an in-band flag configuration unit configured to configure an in-band flag by using the interference reference flag and a block in which the impulsive noise is detected; and
   an interference signal prediction unit configured to predict introduction of an in-band interference signal according to whether the in-band flag exists,
   wherein the transmission signal is a frequency modulated continuous wave.

2. The radar signal processing device of claim 1, wherein the interference reference flag configuration unit is configured to select, as the one or more specific blocks, continuous blocks in each of an up-chirp interval in which a frequency increases along with time based on a maximum frequency of the transmission signal, and a down-chirp interval in which the frequency decreases along with time based on the maximum frequency of the transmission signal.

3. The radar signal processing device of claim 1, wherein the interference reference flag configuration unit is configured to select the one or more specific blocks based on at least one piece of information among information of a time axis position with respect to a maximum frequency of the transmission signal, information of a maximum reception signal delay time for detecting the reception signal, that is the transmission signal reflected from a target and then received, information of a preconfigured interference signal detection sensitivity, and chirp interval information of the transmission signal.

4. The radar signal processing device of claim 3, wherein the interference reference flag configuration unit is configured to select, as the one or more specific blocks in a down-chirp interval of the transmission signal, a reference block determined by using the time axis position with respect to the maximum frequency of the transmission signal and N continuous blocks after the reference block, and then configure the interference reference flag, wherein N is a natural number.

5. The radar signal processing device of claim 3, wherein the interference reference flag configuration unit is configured to select, as the one or more specific blocks in an up-chirp interval of the transmission signal, a reference block determined by using the time axis position with respect to the maximum frequency of the transmission signal and M continuous blocks before the reference block, and then configure the interference reference flag, wherein M is a natural number.

6. The radar signal processing device of claim 3, wherein the interference reference flag configuration unit is configured to determine the number of the specific blocks for which the interference reference flag is configured, in proportion to the interference signal detection sensitivity.

7. The radar signal processing device of claim 1, wherein the in-band flag configuration unit is configured to configure the in-band flag for the block in which the impulsive noise is detected when occurrence of the impulsive noise is detected in the specific block for which the interference reference flag is configured.

8. The radar signal processing device of claim 7, wherein the interference signal prediction unit is configured to determine that the in-band interference signal will be introduced when the block for which the in-band flag is configured is detected.

9. The radar signal processing device of claim 1, further comprising an interference signal avoidance unit configured to control the transmission signal to be frequency-hopped or time-hopped by applying a hopping parameter when introduction of the in-band interference signal is predicted.

10. The radar signal processing device of claim 9, wherein the hopping parameter is configured to be determined by a system parameter and a random parameter, and configured to be generated when the in-band flag is configured.

11. The radar signal processing device of claim 10, wherein the system parameter is configured to be determined to be a preconfigured first value when the block, for which the in-band flag is configured, is positioned in the down-chirp interval of the transmission signal, and configured to be determined to be a preconfigured second value when the block, for which the in-band flag is configured, is positioned in the up-chirp interval of the transmission signal.

12. The radar signal processing device of claim 11, wherein an absolute value obtained by subtracting the second value from the first value is configured to exceed a value of a maximum reception signal delay time for detecting the reception signal that is the transmission signal reflected from a target and then received.

13. A radar signal processing method comprising:
    an interference reference flag configuration step of dividing a transmission signal into a plurality of blocks in preconfigured time units on a time axis, and configuring an interference reference flag for one or more specific blocks selected among the plurality of blocks;
    an impulsive noise detection step of detecting whether an impulsive noise occurs in each of the plurality of blocks, by using a reception signal;
    an in-band flag configuration step of configuring an in-band flag by using the interference reference flag and a block in which the impulsive noise is detected; and
    an interference signal prediction step of predicting introduction of an in-band interference signal according to whether the in-band flag exists, wherein the transmission signal is a frequency modulated continuous wave.

14. The radar signal processing method of claim 13, further comprising an interference signal avoidance step of controlling the transmission signal to be frequency-hopped or time-hopped by applying a hopping parameter when introduction of the in-band interference signal is predicted.

15. The radar signal processing method of claim 13, wherein the interference reference flag configuration step comprises selecting the one or more specific blocks based on at least one piece of information among information of a time axis position with respect to a maximum frequency of the transmission signal, information of a maximum reception signal delay time for detecting the reception signal, that is the transmission signal reflected from a target and then received, information of a preconfigured interference signal detection sensitivity, and chirp interval information of the transmission signal.

16. The radar signal processing method of claim 15, wherein the interference reference flag configuration step comprises selecting, as the one or more specific blocks in a down-chirp interval of the transmission signal, a reference block determined by using the time axis position with respect to the maximum frequency of the transmission signal and N continuous blocks after the reference block, and then configuring the interference reference flag, wherein N is a natural number.

17. The radar signal processing method of claim 15, wherein the interference reference flag configuration step comprises selecting, as the one or more specific blocks in an up-chirp interval of the transmission signal, a reference block determined by using the time axis position with respect to the maximum frequency of the transmission signal and M continuous blocks before the reference block, and then configuring the interference reference flag, wherein M is a natural number.

18. The radar signal processing method of claim 15, wherein the interference reference flag configuration step comprises determining the number of the specific blocks for which the interference reference flag is configured, in proportion to the interference signal detection sensitivity.

\* \* \* \* \*